US006721749B1

United States Patent
Najm et al.

(10) Patent No.: US 6,721,749 B1
(45) Date of Patent: Apr. 13, 2004

(54) POPULATING A DATA WAREHOUSE USING A PIPELINE APPROACH

(75) Inventors: Tarek Najm, Kirkland, WA (US); Ramesh Manne, Redmond, WA (US); Savithri N. Dani, Issaquah, WA (US); Karl D. Johnson, North Bend, WA (US); Degelhan Truesaw, Seattle, WA (US); Daniel P. Boerner, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 547 days.

(21) Appl. No.: 09/611,405

(22) Filed: Jul. 6, 2000

(51) Int. Cl.[7] .................................................. G06F 7/00
(52) U.S. Cl. ........................................ 707/100; 707/202
(58) Field of Search ................................ 707/3, 1, 100, 707/202, 200

(56) References Cited

U.S. PATENT DOCUMENTS

| | | | | |
|---|---|---|---|---|
| 5,675,785 A | * | 10/1997 | Hall et al. .................... | 707/102 |
| 5,752,002 A | * | 5/1998 | Naidu et al. ................... | 703/14 |
| 5,890,154 A | * | 3/1999 | Hsiao et al. .................... | 707/8 |
| 6,067,547 A | * | 5/2000 | Douceur ....................... | 707/100 |
| 6,134,603 A | * | 10/2000 | Jones et al. ................... | 709/330 |
| 6,138,121 A | * | 10/2000 | Costa et al. ................... | 707/100 |
| 6,163,774 A | * | 12/2000 | Lore et al. ..................... | 707/2 |
| 6,167,405 A | * | 12/2000 | Rosensteel, Jr. et al. ..... | 707/102 |
| 6,169,986 B1 | * | 1/2001 | Bowman et al. ............... | 707/5 |
| 6,178,418 B1 | * | 1/2001 | Singer ........................... | 707/3 |
| 6,363,391 B1 | * | 3/2002 | Rosensteel, Jr. ............. | 707/102 |
| 6,418,427 B1 | * | 7/2002 | Egilsson et al. ............... | 707/2 |
| 6,442,560 B1 | * | 8/2002 | Berger et al. ................ | 707/102 |

OTHER PUBLICATIONS

Karuna P. Joshi, Anupam Joshi, Yelena Yesha, and Raghu Krishnapuram, "Warehousing and Mining Web Logs", ACM, pp. 63–68, 1999.*

Steven Tolkin, "Aggregation Everywhere: Data reduction and transformation in the Phoenix data warehouse", ACM, pp. 79–86, 1999.*

W. Perrizo, Z. Zhang, and S. Krebsbach, "A Query Processing Method For Data Warehouses Which Contain Multimedia", ACM, pp. 323–327, 1997.*

Dr, Katherine Jones, "An Introduction to Data Warehousing: What Are the Implications for the Network?", ACM, International Journal Of Network Management, vol. 8, pp. 42–56, 1998.*

"The Data Warehouse Lifecycle Toolkit: Expert Methods for Designing, Developing, and Deploying Data Warehouses", Kimball et al., Wiley Computer Publishing, 1998.

Kimball et al., "The Data Webhouse Toolkit: Building the Web–Enabled Data Warehouse", Wiley Computer Publishing, 2000, 401 pages.

Kimball et al., "The Data Warehouse Toolkit: Practical Techniques for Building Dimensional Data Warehouses", John Wiley & Sons, Inc., 1996, 374 pages.

* cited by examiner

*Primary Examiner*—John Breene
*Assistant Examiner*—Cheryl Lewis
(74) *Attorney, Agent, or Firm*—Lee & Hayes, PLLC

(57) ABSTRACT

Described herein is a data collection and warehousing system that collects log files from a plurality of servers, and that transforms the entries of the log files prior to using them to populate a database. Nightly, the system provides a pre-processing program to each of the servers. The servers executing the pre-processing component to filter the logged data before sending it on to the data collection and warehousing system. The data collection and warehousing system pre-parses each received log file to create dimension and fact tables. During this process, strings are replaced by keys. These keys are calculated on-the-fly by taking a hash of each string. The resulting tables are then further parsed to create further dimension and fact tables that correspond to each of the dimension and fact tables of a relational database schema. After further processing, these tables are loaded into a data warehousing system.

40 Claims, 6 Drawing Sheets

POPULATING A DATA WAREHOUSE USING A PIPELINE APPROACH

TECHNICAL FIELD

The following relates to techniques for gathering data from a variety of sources and using the gathered data to populate relational database tables of a data warehouse.

BACKGROUND

A data warehouse is a database designed to support decision making in an organization. It is normally batch updated on a periodic basis and can contain enormous amounts of data. For example, large retail organizations can have 100 GB or more of transaction history in a data warehouse.

The data in a data warehouse is typically historical and static and may also contain numerous summaries. It is structured to support a variety of analyses, including elaborate queries on large amounts of data that can require extensive searching.

The data warehouse often represents data as a "cube" of three, four, or more dimensions. For example, a business might be modeled as a cube having three dimensions, corresponding real-world business distinctions such as, for example, Product, Time, and Market. Any point within the cube is at the intersection of the coordinates defined by the edges of the cube, and can be viewed as corresponding to a metric or measurement that is valid for the combination of dimension values that define the point. For example, such metrics might include "units sold," "price,", etc. Each point might indicate the price and units sold of a particular product, at a particular time or time period, in a given market.

Figure 1:
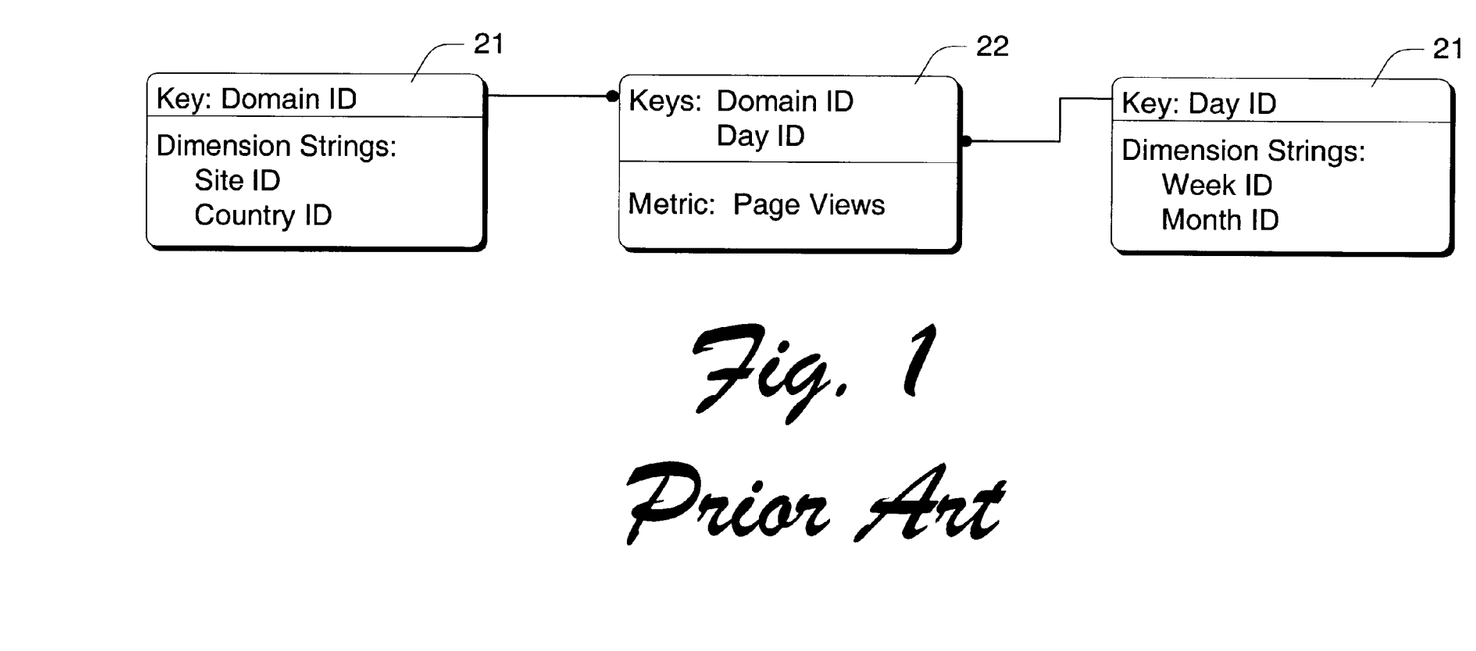
FIG. 1 is a block diagram showing a dimensional data schema in accordance with the prior art.

It is common to implement this data model from within a relational database. A relational database consists of many interrelating tables. FIG. 1 shows an example of such tables. Some of these tables are dimension tables 21. A dimension table is a collection of information describing a business construct. For example, in the FIG. 1 model designed to represent web usage, there is a "Domain" dimension table. The Domain dimension table includes information in the form of strings that describe each target domain, such as the site the domain belongs to and the country code for the domain. Other dimension tables contain information describing concepts such as "Time," "Referring Domain," and many others. Note that dimensions are usually parameters relating to the organization of measured data, and do not indicate the measured data itself.

The tables of FIG. 1 also include one or more fact tables 22. A fact table includes the actual numeric metrics, such as a count of page views, that a user might be interested in viewing. In addition, there are defined relationships between the dimension and fact tables. Specifically, the fact table has a plurality of keys, referred to as primary key IDs, that correspond to similar primary key IDs in the dimension tables. This allows the individual records of the fact table to be indexed or matched up to specific dimensional values—given a set of dimensional values, corresponding metrics can be located.

In the example above, a user wishes to view data from the page views fact table. The Domain dimension table allows the user to choose a single domain, and then see only the data from the page views fact table that corresponds to that target domain. Similarly, the time dimension allows us to choose a single day, and view only the data from the page views fact table that corresponds to the chosen target domain and the chosen date. Choosing the dimensions across which a user wants data to be summarized is sometimes referred to as slicing the data. A definition of the relationship between tables in a data warehouse is called a schema.

Most metrics are aggregates, as they summarize data across criteria provided by one or more dimension tables in the data warehouse. In the example above, the count of page views is aggregated across a specific target domain (from the Domain table) and a specific day (from the Time table). This particular metric provides a count of a given value; other metrics might provide a sum, average, or other summary.

Still other metrics are calculated, rather than aggregated. For example, a data warehouse might provide metrics such as Peak Hour Page Views, which provides the hour during which the most page views are received. This metric is not derived by summarizing a value across dimensions; instead it is calculated by comparing a value across dimensions, and selecting the top value. Other calculated metrics might provide the bottom value, the top or bottom N values, the top or bottom percentage, etc.

Data modeling such as this is described in Kimball, Ralph, The Data *Warehouse Toolkit: Practical Techniques for Building Dimensional Data Warehouses* (Wiley 1996).

Once the tables of a data warehouse are populated with actual data, the warehouse becomes very useful. However, the process of populating the data warehouse can become quite difficult because of the enormous amounts of data invovled.

Consider, as an example, the task of populating a web usage data warehouse in a company such as Microsoft Corporation that currently maintains nearly thirty web sites. Many of these sites are administered by different divisions within the company, in different parts of the world. Furthermore, each site might have a number of individual servers. For example, company such as Microsoft might maintain more than 500 servers, which might use different types of server software. Together, this number of servers might generate over 1.5 billion log records, each representing a page hit. For data warehousing purposes, it is desired to combine data logged by each of these servers and use it to populate a data warehouse.

This is normally accomplished using "Extract, Transform, and Load" (ETL) methodology. Extraction refers to actually obtaining the data from individual data sources such as servers. This process in itself can be difficult because of the enormous size of the data.

Transformation indicates processing the data to put it into a more useful form or format: removing redundancies, adding business logic, filtering irrelevant data, integrating additional information, etc.

Loading refers to the process of loading the data into the tables of a relational database.

Although data warehousing techniques have been used in a number of different environments, it is not believed that data warehousing has been successfully implemented in a system such as that mentioned above, in which such a huge amount of data needs to be extracted and transformed from such a large number of different servers, and then used to populate a single data warehouse. The invention described herein addresses this deficiency of the prior art.

SUMMARY

Described below is a data collection system and a method for populating a data warehouse. The system uses a pipeline approach, in which individual log files are retrieved from individual servers and processed in sequence through various operations. These operations include a pre-parsing operation that parses each log file to create a file representing dimensional data, and another file representing metric data. Other transformation logic is also applied during this stage.

These files are then subject to a subsequent parsing operation that parses the pre-processed files into tables corresponding to tables of the data warehouse. These tables are eventually merged and loaded directly into the relational database of the data warehouse, after removing duplicates, sorting, and counting aggregates. Using these techniques, the majority of processing is performed by programs other than relational database programs, greatly increasing the speed of processing.

Significant efficiency is gained by pushing a pre-processing component to each server on a daily basis. Using this component, each server filters its own data before sending it to the data collection system.

In addition, the application of transformation logic results in dimension strings being replaced by keys. Rather than referring to a database for such keys when applying the transformation logic, the system calculates each key as a hash of the string. This eliminates the performance bottleneck that otherwise results from reverse lookups in a database.

DETAILED DESCRIPTION

The following description sets forth a specific embodiment of a data warehousing technique for logging various parameters from many different computers. The described embodiment incorporates elements recited in the appended claims, and is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Figure 2:
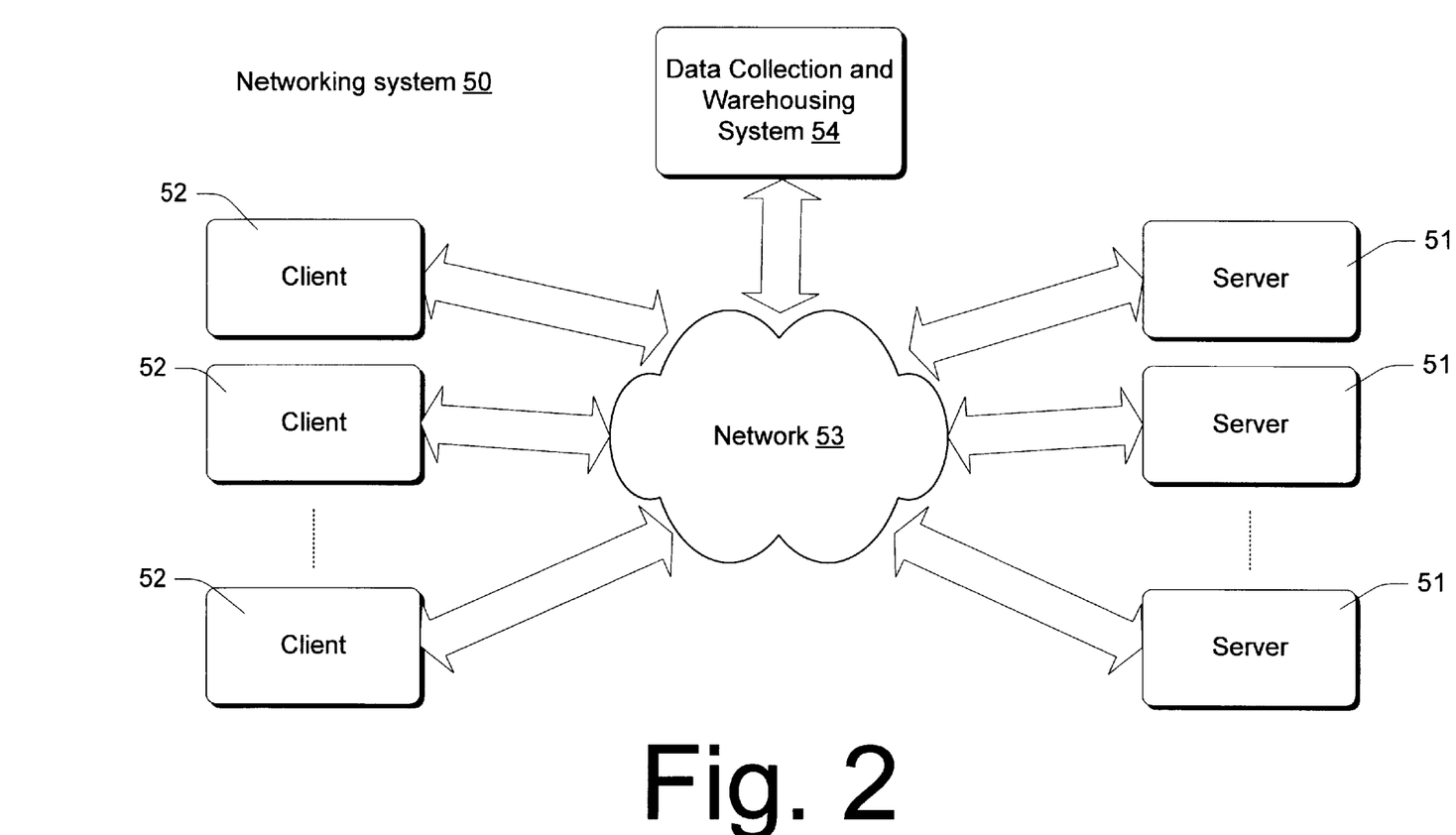
FIG. 2 shows a client/server network system and a data collection and warehousing system.

FIG. 2 shows a network system 50 comprising a plurality of servers 51 and clients 52. These computers are connected for high-speed data communications over a network 53, using well-known networking technology. The public Internet is one example of a network such as this.

Servers 51 accept requests from large numbers of remote network clients 52. The data servers provide responses comprising data that potentially includes graphically formatted information pages. In many cases, the data is in the form of HTML documents.

In addition to the servers and clients, the system of FIG. 2 includes a central collection facility or data warehousing system 54. The data warehousing system communicates through network 53 with other network nodes such as servers 51 and clients 52, although other means of communication might also be utilized. The data warehousing system 54 will be described in more detail below.

Exemplary Computer Environment

Figure 3:
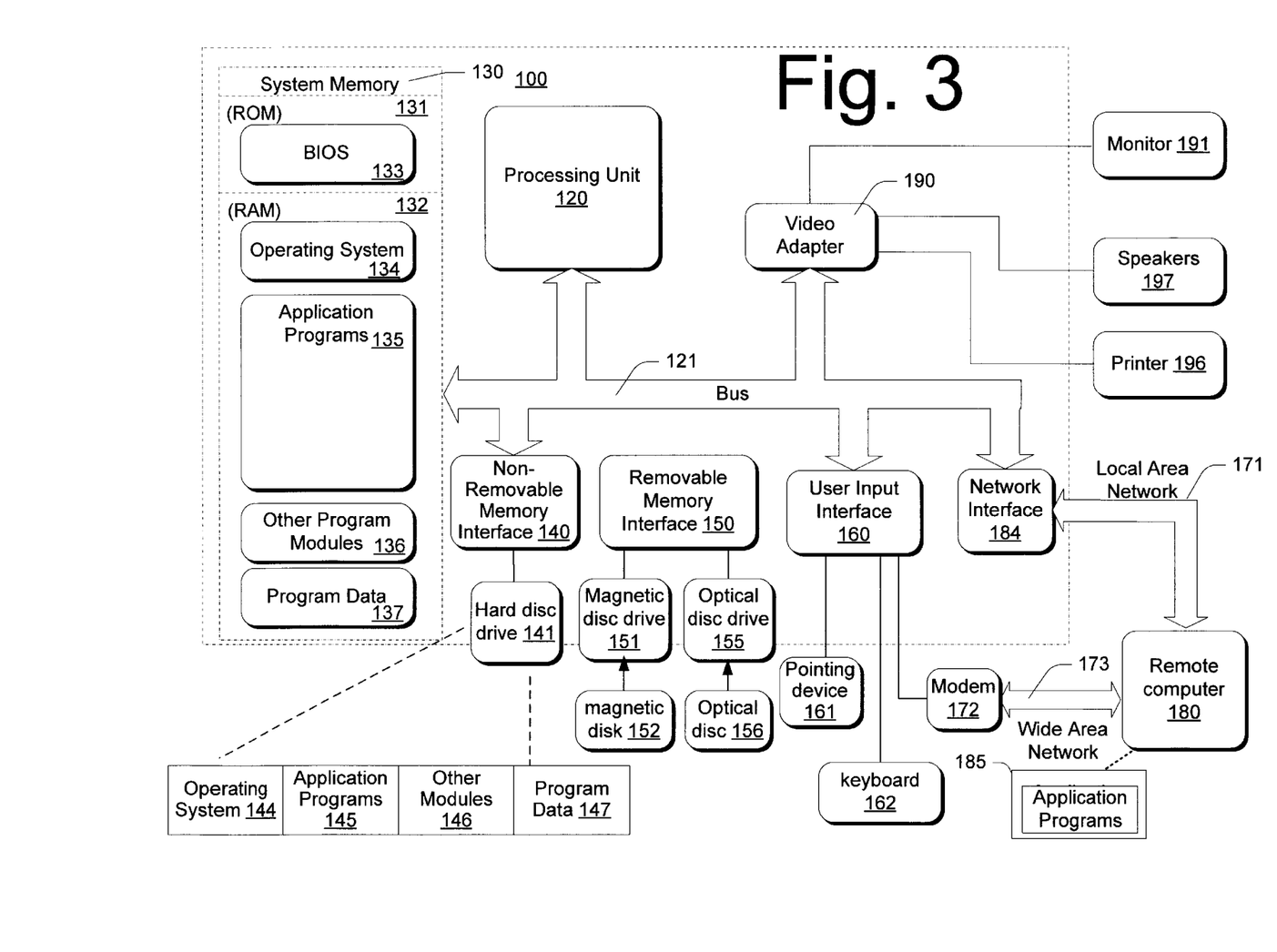
FIG. 3 shows an example of a computer that might be used as part of the client/server network system and a data collection and warehousing system of FIG. 2.

The various components and functionality of FIG. 2 are implemented with a number of individual computers. FIG. 3 shows components of typical example of such a computer, referred by to reference numeral 100. The components shown in FIG. 3 are only examples, and are not intended to suggest any limitation as to the scope of the functionality of the invention; the invention is not necessarily dependent on the features shown in FIG. 3.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 3, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 100 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 3 provide storage of computer-readable instructions, data structures, program modules, and other data for computer 100. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 184. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Data Warehousing System

Figure 4:
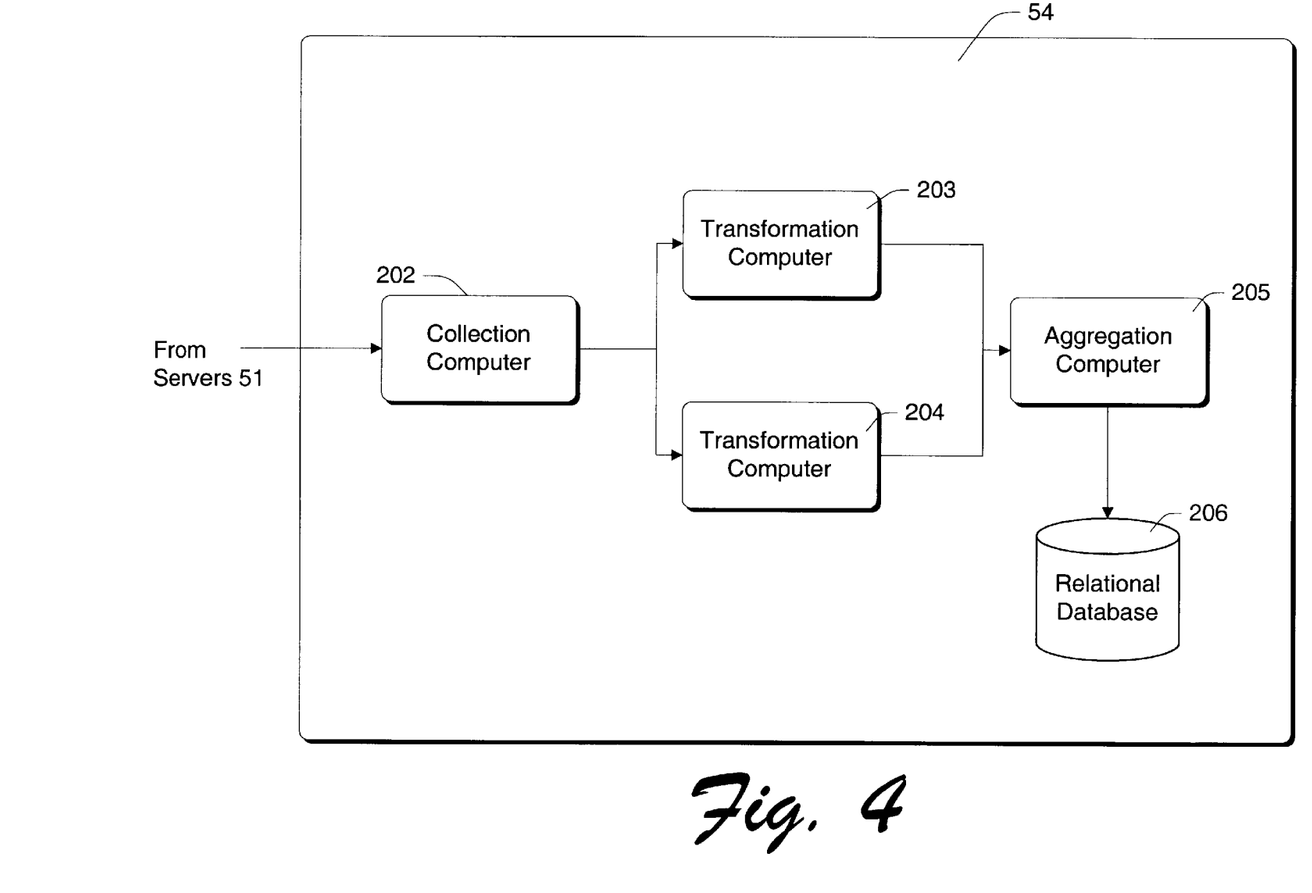
FIG. 4 is a block diagram showing details of a data collection and warehousing system such as the one shown in FIG. 2.

FIG. 4 shows elements of data collection and warehousing system 54, which is connected for data communications with network servers 51 (FIG. 2). Although only a relatively few servers are shown, it should be recognized that the system is intended for use with very large numbers of such servers and corresponding log entries. In particular, the system has been designed for use with over 500 Internet servers located in different parts of the world. Collectively, these servers generate over 1.5 billion log entries which are processed by the system shown in FIG. 4.

The data warehousing system includes a data collection computer 202, one or more transformation computers 203 and 204, an aggregation computer 205, and a database repository or server 206. The process used in the system of FIG. 4 distributes different processing tasks to various of the illustrated computers as described below. However, other hardware configurations and other divisions of responsibility are also possible. In some embodiments, the processes implemented by data collection computer 202, transformation computers 203 and 204, and aggregation computer 205 might be might be performed by a single computer.

Figure 5:
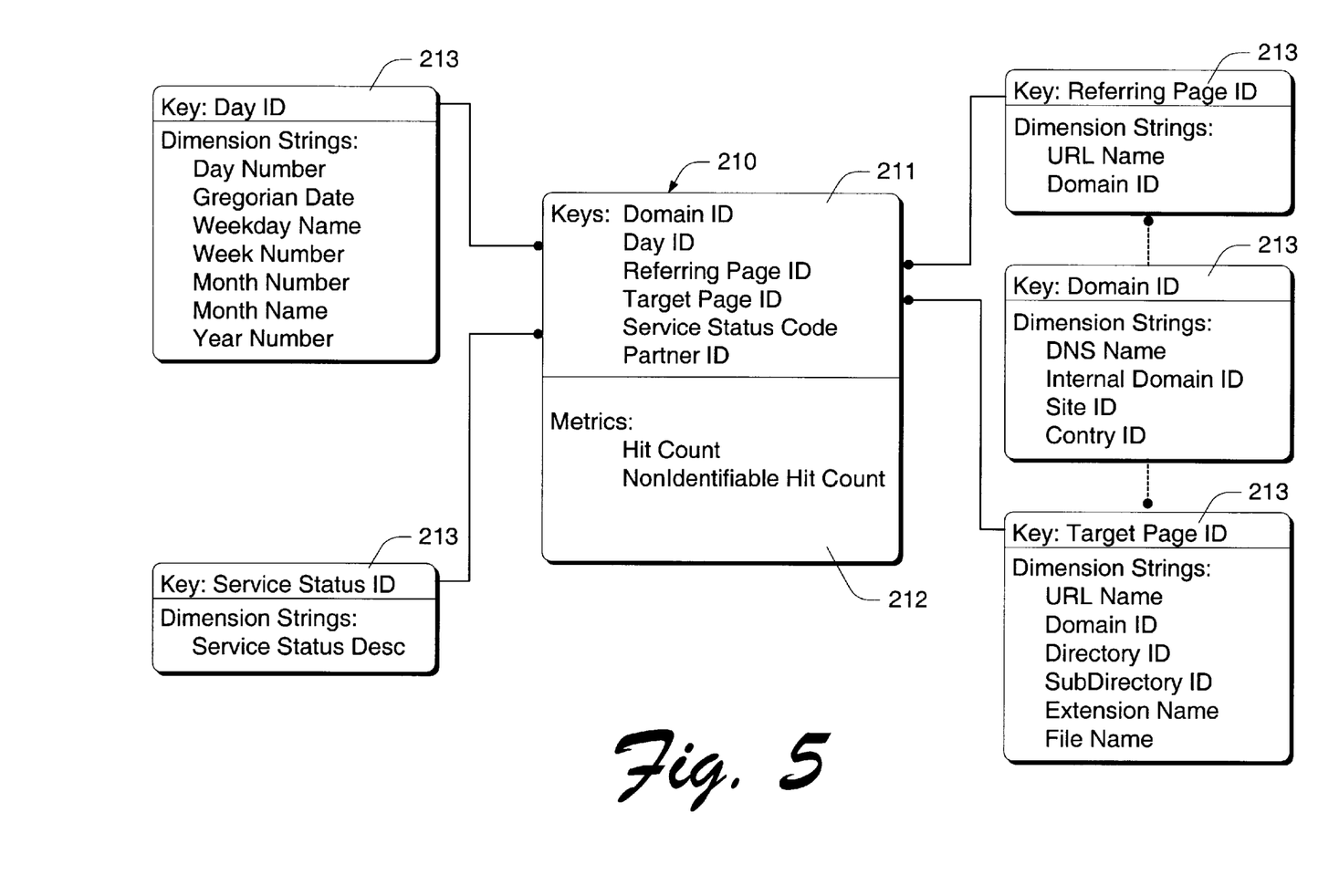
FIG. 5 is an example of a snowflake data schema.

The database repository 206 is a relational database, which comprises the data warehouse. Database 206 is typically an SQL database. Its tables are related to each other under a schema that is carefully designed to efficiently represent the targeted data, and to allow a user to slice the data for viewing desired statistics. In the described embodiment, the database is modeled dimensionally using a so-called "snowflake" schema, an example of which is shown in FIG. 5. In a schema such as this, a central fact table 210 contains a plurality of keys 211 and metrics 212. The keys allow the metrics to be sliced in various different ways. Specifically, the primary keys relate the fact table to surrounding dimensions or dimension tables 213 that contain definitions of the various dimensions by which the metrics can be organized or sliced: time, domain, target page, etc. Note that this is just an example, and that the actual database contains a plurality of fact tables and associated dimension tables. Furthermore, other types of schemas, such as "star" schemas, can also be used.

The computers shown in FIG. 4 communicate with each other and with servers 51 through conventional communications channels, including the Internet, local area networks, and/or wide area networks.

The components of FIG. 4 implement a method of populating relational database 206 with logged data from a plurality of servers 51. The components form a processing pipeline that receives individual log files from the plurality of servers, on a periodic basis, and passes the received files through a sequence of operations. These operations are outlined immediately below, and will be described in more detail in the following sections.

System 54 periodically provides a pre-processor component to each of servers 51.

Each server executes the pre-processor component to pre-process that server's data.

Each server compresses the pre-processed log data and sends it to collection computer 202.

Collection computer 202 uncompresses the pre-processed data and provides it to one or more transformation computers 203 and 204.

For each pre-processed log file, the transformation computers parse the data to generate (a) a fact file containing one or more primary key IDs and metrics for eventual use in the data warehouse, and (b) a dimension file containing one or more primary key IDs and strings for eventual use in the data warehouse.

During this parsing, the transformation computers scrub the fact files and dimension files and apply transformation logic to the fact files and dimension files.

The fact files are provided to aggregation computer 205, which further parses the files to generate, for each fact file, a plurality of fact tables corresponding to different fact tables of the data warehouse. Each fact table contains one or more primary key IDs and corresponding metrics.

The dimension files are also provided to aggregation computer 205, which further parses the files to generate, for each dimension file, a plurality of dimension tables corresponding to different dimension tables of the data warehouse. Each dimension table contains one or more primary key IDs and dimension strings.

The aggregation computer merges tables corresponding to the same data warehouse table to generate fact and dimension tables that each correspond to a single one of the data warehouse tables.

The aggregation computer then loads these fact and dimension tables directly into the corresponding data warehouse tables.

Little or no further processing is required within the relational database structure of the data warehouse.

This pipeline provides a capacity and flexibility that has previously been unattainable without significantly greater investments in computer processing power.

Distributed Server Pre-Processing

Figure 6:
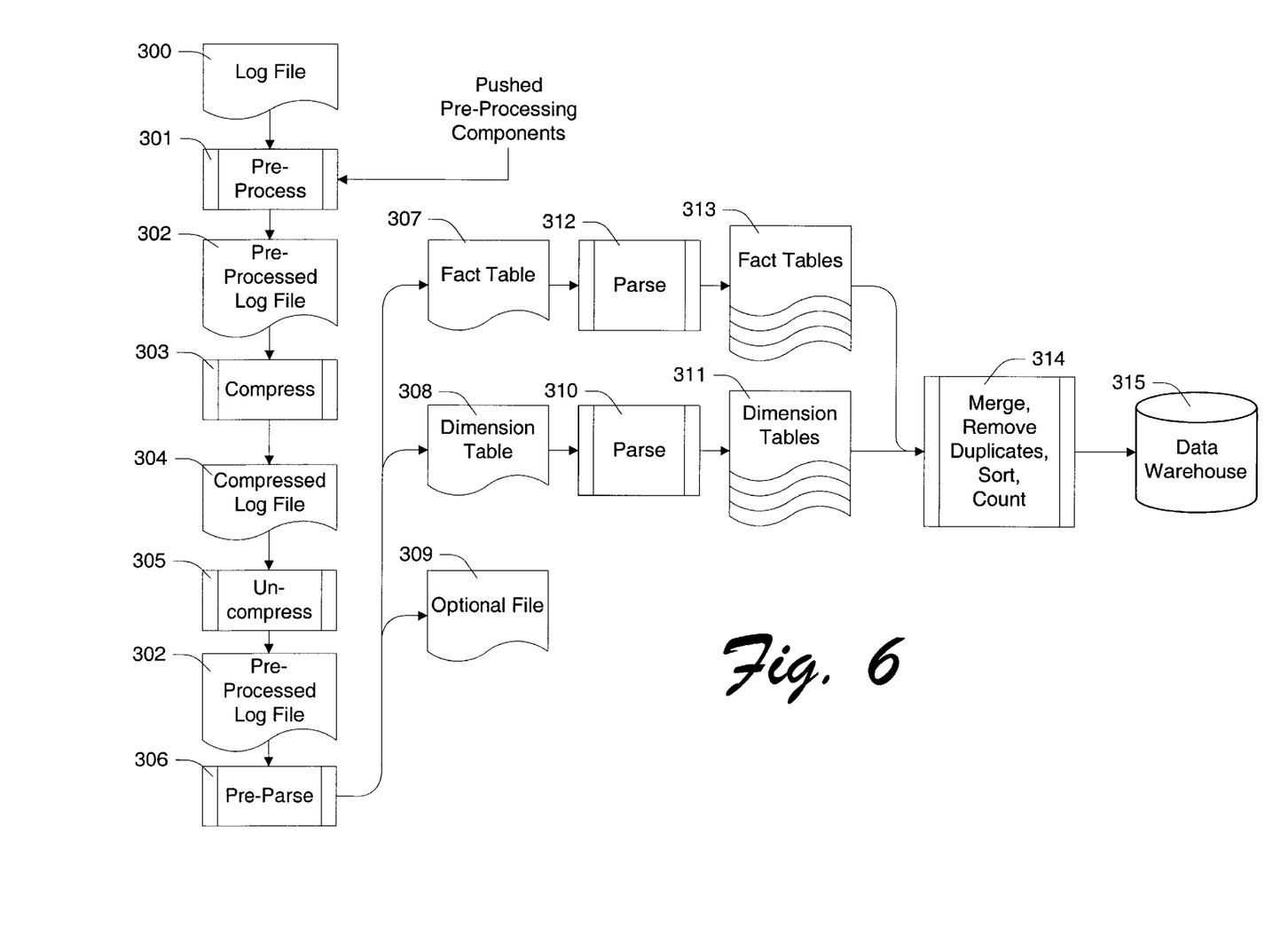
FIG. 6 is a process and data flow diagram s showing a data processing pipeline implemented by the system of FIG. 4.

FIG. 6 illustrates the operations that are described in this and the following sections. The process begins with a plurality of log files 300 that are generated by the server software on each of servers 51 (FIG. 2).

The described system moves a significant amount of processing to the network servers 51 themselves. This greatly reduces the burden on the data collection and warehousing system, without presenting an unacceptable load on the distributed servers.

In actual embodiment, the network servers perform selective filtering and data scrubbing in a pre-processing operation 301, to produce a pre-processed log file 302. For example, in the web usage arena, the servers remove records relating to peripheral or non-useful events, such records relating to requests for image data (graphics files such as .gif, jpeg, and .bmp files). Note that the following description is set in the context of a data warehouse for collecting web usage statistics. However, the described techniques are also applicable to collecting other types of data.

The inventors have discovered that trying to maintain pre-processing software on each of the servers (located worldwide) is unworkable. Instead, the described data collection and warehousing system is configured to "push" such software to each server on a nightly basis. Using this technique, the software can be updated as desired, without human intervention at the servers.

Each server runs a commercially available ITG scheduler. On each server, a job is scheduled to run at midnight—at a time when server and network usage is approaching its lowest. The job retrieves several programs from the collection server, and executes the jobs against the server's log file of the previous day. These programs include a metabase reader and a pre-processing component.

In the described embodiment, each server runs Microsoft Corporation's "Internet Information Server" (IIS) software that maintains log files indicating each "hit" on a resource served by that the server. The metabase reader is configured to interrogate the IIS server metabase to ascertain the DNS names for each of the virtual sites hosted by the IIS server (note that some servers host only one site). These names are used to rename each of the IIS log files on that server in a format that includes the DNS name, the server name, the logging date, etc.

The pre-processing component is a program that reads through each of the closed and renamed log files on that server for the previous day, and filters undesired and/or extraneous data such as requests for different types of graphics images. This eliminates a tremendous amount of data from the server's log files. Transformation and application of business logic can also be applied at this state of pre-processing stage. For example, numerical data can often be transformed into user-friendly textual names. As a more specific example, numeric server IP addresses can be replaced with domain names. This operation greatly reduces downstream processing, which would otherwise require reverse database lookups to find domain names for many different IP addresses. The fact that the pre-processing component is pushed anew to the servers every night means that the transformation logic can be easily changed, again without human intervention at the servers.

The pre-processing component runs in parallel on all the servers, which effectively distributes this stage of data pre-processing without significantly affecting ability of the servers to perform their primary functions. This results in one or more pre-processed log files 302 on each of servers 51.

The scheduled programs also include a compression program that compresses the pre-processed log files in an operation 303. After such compression, another uploaded and scheduled program transmits the compressed log files 304 to collection computer 202. This step is performed in a staggered manner from the plurality of servers 51 over a six to nine hour period.

Pre-Parsing, Transformation, and Scrubbing

The individual, pre-processed log files from the plurality of servers are uncompressed as they arrive in an operation 305 to produce the pre-processed log files 302, and sent to one of transformation computers 203 and 204, which perform the operations described in this section. In the current embodiment having over 500 servers, only a single transformation computer is required for this 10–12 hour job. This computer is an SMP (Symmetric Multi-Processing) server having 2 gigabytes of main memory, 4 processors running at 400 MHz, and roughly 600 gigabytes of disk space. This computer processes roughly 125 gigabytes of input data every day, which is contained in over 200 million data rows.

Note that the operations performed by transformation computers 203 and 204 are performed on a per-file basis. That is, each log file received from one of servers 51 is individually processed and then individually saved as one or more new files. These operations are performed or initiated by Perl scripts. Perl is a general-purpose programming language that is widely used for World Wide Web development, text processing, Internet services, mail filtering, graphical programming, systems administration, and many other tasks.

For each log file, the transformation computer's Perl script initiates a high-speed, multi-threaded C++ pre-parser 306. The parser reads each log row or entry and parses it into parameters corresponding to metrics and dimension strings that will eventually be used in the relational database. More specifically, each log file is read and transformed from a single, comma-delimited, variable length, ASCII data set into a plurality of data tables or files in which numbers are represented by value and type rather than by text. The data files contain different types of data: a fixed-length fact file 307 (one such file per input file) has records that each indicate a set of fact table primary key IDs and corresponding metrics (which will eventually be used to populate the fact tables of the relational database); a fixed length dimension file 308 (one such file per input file) has records that each indicate a primary key ID and corresponding string (which will eventually be used to populate the dimension tables of the relational database); and an optional comma-delimited file 309 (one such file per input file) contains primary IDs and query string fields that can be used for further GUID profiling, data parsing, and data mining. Thus, for each input file, the parser generates a fact file 307, a dimension file 308, and in some cases the optional file 309. Erroneous data is written to error files during processing.

During the pre-parsing, the data is thoroughly scrubbed by applying a series of business rules and long text strings that have been specified in a configuration file. "Data scrubbing" is a term used to describe a process of making data more accurate, concise, and consistent. It refers to operations such as ensuring consistent descriptions, punctuation, syntax and other content issues, and also to substitution of data with more concise representations such as with primary key IDs.

The text strings specified in the configuration file identify dimensional values that will be used in the data warehouse, and the same strings occur repetitively in the log files. Accordingly, it is desirable to represent such strings with primary keys. One way to do this is to pre-assign a primary key ID to each string, and to create a database that lists the correspondence between strings and primary key IDs. During parsing, a reverse lookup is performed in the database to find the primary key corresponding to any given string.

In the described embodiment, however, primary keys for strings such as this are calculated on the fly, as the strings are encountered. Specifically, upon encountering a string that is to be represented by a key, the key is calculated with a hash function. The string is recalculated every time it is encountered, even if it was previously calculated in conjunction with another record. This eliminates the reverse data lookup that might have been used in the prior art.

A hash function in this context is a formula or algorithm that turns a variable-sized amount of text into a much smaller, typically fixed-sized, output value (hash value). In this case, the well-known MD5 (Message Digest 5) one-way hash function is used to produce a unique 16 byte binary primary key for each unique text string: the same text string always hashes to the same primary key, and each different string hashes to a different primary key. This method eliminates the need to look up the key IDs in a database, and greatly improves processing speed. At later processing stages, when loading into the relational database, the strings specified in the configuration file are hashed again to create a cross-reference of strings and primary key IDs for one-time use in loading the strings into dimension tables.

As an optimization, some of the strings are hashed only once. For example, text strings that are known to be common to all records are obtained from the input file name and hashed only once.

The C++ pre-parser uses a variety of additional optimization techniques:

Asynchronous I/O. I/O completion ports are used for reading and writing files. This is an asynchronous I/O mechanism, so there is no time spent blocking on a file read or file write. Since the parser reads one file and writes to three or more files, the performance benefits are significant. This technique also enables utilization of all a computer's processors, thereby contributing to enhanced scalability.

Concurrency. A configurable parameter gives the number of threads that should be simultaneously running. If the user wishes the default value to be used, the parser will set this value to 0, specifying that only one thread per processor will be executing at any point in time.

Write Sequence. The parser does not preserve the sequence of the log lines in the output files. The transformed log rows are written in a random fashion, as and when a block of lines are ready to be output. This minimizes the use of buffers.

Shared Data. Since the order of output lines is unimportant, each file is divided into n non-overlapping regions and n threads are used to process these regions independently of each other. The region borders are processed last. This minimizes the amount of writeable data shared between the threads.

Synchronization Objects. Synchronization objects are not required for access to access read-only data applicable to the threads. Configuration information is initialized at the of the parsing process, before the I/O threads are activated.

Buffering. Individual input files are opened with the "FILE_NO_BUFFERING" option. A list of file read blocks are maintained and these are directly used to read from the file. The file read block size or the number of bytes read at a time should be a multiple of the volume sector for optimal performance. This value is determined at run time.

Memory Allocation. Separate pools are used for buffers of the same type and size. These buffers, when freed, are returned to the pool and not to the operating system.

Scanning the Read Block. The number if passes over the read buffer is kept minimal. The parser does as much in one traversal as possible. Traversal loops are in line and transformations are done character-wise rather than calling different string functions one after another.

Configuration Analysis. The parser associates flags with any current column attributes that are strings.

Column Delimiters. Although the parser supports any number of characters as a column delimiter, configuration information is analyzed as a preliminary operation to see whether only a single character is used. If only a single character is used, the parser uses the "strchr( )" function instead of the slower sub-string matching ("strstr( )") to tokenize the input log lines.

String Processing. The parser avoids string duplication as much as possible while preparing the output fields. For example, the input log line is mangled to obtain the output fields.

String Concatenation. The parser generally does not use the string concatenation function "strcat( )". Instead, the parser keeps track of free buffer positions and copies to those positions.

Filenames. The target name, the server name, etc., which are part of the file name in each log row, are not output on every line. Instead, these strings are obtained later, from the log file name.

Build Options. Typical compiler build options are used, including the following: discard unreferenced code, merge read-only data with the code section, allocate only once for duplicate string constants, minimize size, etc.

These optimization techniques, in combination, allow processing speeds of up to 40,000 input rows per second. This speed allows parsing of an entire day's worth of log files, detailing over 1.5 billion logged server hits, within a few hours.

Aggregation

After the data scrubbing and transformation operations described above, the resulting output files are moved or made available to aggregation computer 205. Note that there are at least two, and possibly three or more output files per input file received from a server. In the described embodiment, this amounts to over 2000 files to be processed by aggregation computer 205.

The aggregation computer utilizes the dimension files 307 and fact files 308 produced during the pre-parsing process. It examines and further parses each of these files and produces, from each file, a plurality of individual tables. The individual tables correspond to individual dimension or fact tables within the relational database.

More specifically, the aggregation computer parses (operation 310) each dimension file 308 and from the examined data creates a plurality of dimension tables 311 corresponding to the dimensions used in the relational database. If the database uses six dimensions, and has six dimension tables, six non-relational tables are created. This operation is performed with a C++ program.

Similarly, the aggregation computer parses (operation 312) each fact file 307 and from the examined data creates a plurality of fact tables 313 corresponding to different fact tables defined in the relational database. This operation is accomplished using an off-the-shelf program called SYNCSORT®, which is available from SyncSort Corporation of Woodcliff Lake, N.J. SYNCSORT® is a high performance sort/merge/copy utility. It sorts a wide variety of record types and data formats, provides general purpose record processing such as filtering, reformatting and summarization for file and data conversion, and minimizes sorting time for large volumes of data.

This process results in a number of different files for each of the input files from servers 51. It should be recognized, however, that each log file received from a server 51 has resulted in a set of these files. The SYNCSORT® program is used to merge the files of each type, to create a single file of each type—a single table for each different dimension and single fact table of the relational database.

An additional SYNCSORT® command is used to remove duplicates in each of the merged dimension table files. This reduces their size dramatically.

Finally, a plurality of SYNCSORT® command line scripts are used to sort the fact files and count up metrics for aggregate functions. This approach is much faster than trying to accomplish such sorting and counting from within the relational database itself.

The merging, duplicate removal, sorting, and counting steps are represented in FIG. 6 by operation 314.

Loading

After the processing steps described above, there is a single sorted table file for every dimension and fact table of the data warehouse's relational database 315. These table files are loaded directly into the corresponding tables of the database. Little or no further processing is required before accessing the data. An appropriate user interface to provide for convenient access by users.

Conclusion

The described system allows very efficient and reliable collection of data from a very large number of servers, while requiring very little processing hardware. Although the system has been described as collecting web usage data, the same techniques can be used for collecting data relating to other environments, such as in conjunction with membership and registration services, search engines, advertising, finance, e-commerce, etc., and to gather other types of data such as performance data.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A data collection and warehousing system comprising one or more computers that implement a processing pipeline, wherein the pipeline receives individual log files from a plurality of different servers on a periodic basis and passes the received files through a sequence of operations, the operations comprising:

parsing the log files to generate, for each data file, (a) a fact file containing one or more primary key IDs and metrics for eventual use in a data warehouse, and (b) a dimension file containing one or more primary key IDs and strings for eventual use in the data warehouse;

parsing the fact files to generate, for each fact file, a plurality of fact tables corresponding to different fact tables of the data warehouse, each fact table containing one or more primary key IDs and corresponding metrics;

parsing the dimension files to generate, for each dimension file, a plurality of dimension tables corresponding to different dimension tables of the data warehouse, each dimension table containing one or more primary key IDs and dimension strings;

merging tables corresponding to the same data warehouse table to generate fact and dimension tables that each correspond to a single one of the data warehouse tables; and loading the merged tables into the data warehouse tables.

2. A system as recited in claim 1, wherein parsing the log files further comprises substituting keys for text strings.

3. A system as recited in claim 1, wherein parsing the log files further comprises substituting keys for text strings, wherein the keys are obtained by calculating a hash value from the strings as the strings are encountered.

4. A system as recited in claim 1, wherein parsing the log files further comprises scrubbing the data files.

5. A system as recited in claim 1, wherein the operations further comprise sorting and counting the metrics of the merged tables prior the loading operation.

6. A system as recited in claim 1, wherein the data warehouse is a relational database and parsing the log files is performed with one or more special-purpose programs other than a relational database program.

7. A system as recited in claim 1, wherein the data warehouse is a relational database and parsing the fact files is performed with one or more programs other than a relational database program.

8. A system as recited in claim 1, wherein the data warehouse is a relational database and parsing the dimension files is performed with one or more programs other than a relational database program.

9. A system as recited in claim 1, wherein:

the data warehouse is a relational database;

parsing the log files is performed with one or more special-purpose programs other than a relational database program;

parsing the fact files is performed with one or more programs other than a relational database program; and parsing the dimension files is performed with one or more programs other than a relational database program.

10. A system as recited in claim 1, wherein:

the data collection and warehousing system periodically provides a pre-processor component to the plurality of servers for execution by each of the servers to pre-process one or more log files on that server;

the data collection and warehousing system receives the pre-processed log files from the individual servers after they have executed the pre-processor component.

11. A method of populating a data warehouse with logged data from a plurality of servers, wherein the data warehouse comprises a relational database having a plurality of fact and dimension tables, the method comprising the following operations:

periodically receiving the logged data from the individual servers;

for the logged data from each server, parsing the logged data to generate (a) a fact file containing one or more primary key IDs and metrics for eventual use in the data warehouse, and (b) a dimension file containing one or more primary key IDs and strings for eventual use in the data warehouse;

from each of the fact files, creating non-relational fact tables corresponding to fact tables of the data warehouse, each fact table containing one or more primary key IDs and corresponding metrics;

from each of the dimension files, creating non-relational dimension tables corresponding to dimension tables of the data warehouse, each dimension table containing one or more primary key IDs and dimension strings;

merging the non-relational fact tables;

merging the non-relational dimension tables;

loading the non-relational fact tables into corresponding relational fact tables of the relational database;

loading the non-relational dimension tables into corresponding relational dimension tables of the relational database.

12. A method as recited in claim 11, further comprising removing duplicates from the merged non-relational dimension tables.

13. A method as recited in claim 11, wherein parsing the logged data comprises substituting keys for text strings.

14. A method as recited in claim 11, wherein parsing the logged data comprises substituting keys for text strings, wherein the keys are obtained by calculating a hash value from the strings as the strings are encountered.

15. A method as recited in claim 11, wherein parsing the logged data comprises scrubbing the logged data.

16. A method as recited in claim 11, further comprising sorting and counting the metrics of the merged non-relational tables prior to the loading.

17. A method as recited in claim 11, wherein parsing the logged data is performed with one or more special-purpose programs other than a relational database program.

18. A method as recited in claim 11, wherein parsing the non-relational fact tables is performed with one or more special-purpose programs other than a relational database program.

19. A method as recited in claim 11, wherein parsing the non-relational dimension tables is performed with one or more programs other than a relational database program.

20. A method as recited in claim 11, wherein:
   parsing the logged data is performed with one or more special-purpose programs other than a relational database program;
   parsing the non-relational fact tables is performed with one or more programs other than a relational database program; and
   parsing the non-relational dimension tables is performed with one or more programs other than a relational database program.

21. A method as recited in claim 11, further comprising:
   periodically providing a pre-processor component to the plurality of servers for execution by each of the servers to pre-process one or more log files on that server;
   receiving the pre-processed log files from the individual servers after they have executed the pre-processor component.

22. One or more computer-readable media containing instructions for populating a data warehouse with logged data from a plurality of servers, wherein the data warehouse comprises a relational database having a plurality of fact and dimension tables, the instructions performing operations comprising:
   periodically providing a pre-processor component to the plurality of servers for execution by each of the servers to pre-process one or more log files on that server;
   receiving the pre-processed log files from the individual servers after they have executed the pre-processor component;
   for each received log file, parsing the log file to generate (a) a fact file containing one or more primary key IDs and metrics for eventual use in the data warehouse, and (b) a dimension file containing one or more primary key IDs and strings for eventual use in the data warehouse;
   from each of the fact files, creating non-relational fact tables corresponding to fact tables of the data warehouse, each fact table containing one or more primary key IDs and corresponding metrics;
   from each of the dimension files, creating non-relational dimension tables corresponding to dimension tables of the data warehouse, each dimension table containing one or more primary key IDs and dimension strings;
   loading the non-relational fact tables into corresponding relational fact tables of the relational database;
   loading the non-relational dimension tables into corresponding relational dimension tables of the relational database.

23. One or more computer-readable media as recited in claim 22, the operations further comprising removing duplicates from the non-relational dimension tables.

24. One or more computer-readable media as recited in claim 22, wherein parsing the log files comprises substituting keys for text strings.

25. One or more computer-readable media as recited in claim 22, wherein parsing the log files comprises substituting keys for text strings, wherein the keys are obtained by calculating a hash value from the strings as the strings are encountered.

26. One or more computer-readable media as recited in claim 22, wherein parsing the log files comprises scrubbing the log files.

27. One or more computer-readable media as recited in claim 22, the operations further comprising sorting and counting the metrics of the merged non-relational tables prior to the loading.

28. One or more computer-readable media as recited in claim 22, wherein parsing the log files is performed with one or more special-purpose programs other than a relational database program.

29. One or more computer-readable media as recited in claim 22, wherein parsing the non-relational fact tables is performed with one or more special-purpose programs other than a relational database program.

30. One or more computer-readable media as recited in claim 22, wherein parsing the non-relational dimension tables is performed with one or more programs other than a relational database program.

31. One or more computer-readable media as recited in claim 22, wherein:
   parsing the log files is performed with one or more special-purpose programs other than a relational database program;
   parsing the non-relational fact tables is performed with one or more programs other than a relational database program; and
   parsing the non-relational dimension tables is performed with one or more programs other than a relational database program.

32. A method of populating a data warehouse with logged data from a plurality of servers, comprising:
   periodically providing a data processing program to the plurality of logging servers for execution by each of the servers to pre-process data on that server;
   executing the data processing program on each of the plurality of servers to produce pre-processed data;
   providing the pre-processed data to a central collection facility;
   further processing the data at the central collection facility; and
   loading the further processed data into the data warehouse.

33. A method as recited in claim 32, wherein the further processing at the central collection facility comprises:
   for the data from each server, parsing the data to generate (a) a fact file containing one or more primary key IDs and metrics for eventual use in the data warehouse, and (b) a dimension file containing one or more primary key IDs and strings for eventual use in the data warehouse;
   from each of the fact files, creating non-relational fact tables corresponding to fact tables of the data warehouse, each fact table containing one or more primary key IDs and corresponding metrics;
   from each of the dimension files, creating non-relational dimension tables corresponding to dimension tables of the data warehouse, each dimension table containing one or more primary key IDs and dimension strings;
   merging the non-relational fact tables;
   merging the non-relational dimension tables;
   loading the non-relational fact tables into corresponding relational fact tables of the data warehouse;
   loading the non-relational dimension tables into corresponding relational dimension tables of the data warehouse.

34. One or more computer-readable media containing computer-executable instructions for performing operations comprising:

daily sending a data processing program to a plurality of logging servers for execution by each of the servers to pre-process data on that server;

receiving pre-processed data from the servers;

transforming the data for use in a data warehouse; and loading the transformed data into the data warehouse.

35. One or more computer-readable media as recited in claim 34, wherein the transforming comprises:

for the pre-processed data from each server, parsing the data to generate (a) a fact file containing one or more primary key IDs and metrics for eventual use in the data warehouse, and (b) a dimension file containing one or more primary key IDs and strings for eventual use in the data warehouse;

from each of the fact files, creating non-relational fact tables corresponding to fact tables of the data warehouse, each fact table containing one or more primary key IDs and corresponding metrics;

from each of the dimension files, creating non-relational dimension tables corresponding to dimension tables of the data warehouse, each dimension table containing one or more primary key IDs and dimension strings;

merging the non-relational fact tables;

merging the non-relational dimension tables;

loading the non-relational fact tables into corresponding relational fact tables of the data warehouse;

loading the non-relational dimension tables into corresponding relational dimension tables of the data warehouse.

36. A data collection and warehousing facility comprising one or more computers programmed to perform operations comprising:

daily sending a data processing program to a plurality of servers for execution by each of the servers to pre-process log files on that server;

receiving pre-processed log files from the servers;

transforming the log files to produce transformed data; and loading the transformed data into a data warehouse.

37. A data collection and warehousing facility as recited in claim 36, wherein the further processing at the central collection facility comprises:

for the data from each server, parsing the data to generate (a) a fact file containing one or more primary key IDs and metrics for eventual use in the data warehouse, and (b) a dimension file containing one or more primary key IDs and strings for eventual use in the data warehouse;

from each of the fact files, creating non-relational fact tables corresponding to fact tables of the data warehouse, each fact table containing one or more primary key IDs and corresponding metrics;

from each of the dimension files, creating non-relational dimension tables corresponding to dimension tables of the data warehouse, each dimension table containing one or more primary key IDs and dimension strings;

merging the non-relational fact tables;

merging the non-relational dimension tables;

loading the non-relational fact tables into corresponding relational fact tables of the data warehouse;

loading the non-relational dimension tables into corresponding relational dimension tables of the data warehouse.

38. A method of transforming data records, wherein certain strings are repeated within the data records, comprising:

upon encountering one of the strings in a data record, calculating a hash value from said one of the strings;

replacing said one of the strings in the data record with the calculated hash value;

upon encountering the same string in a subsequent data record, recalculating the hash value from the string and replacing the string in the subsequent data record with the calculated hash value, without looking up the previously calculated hash value;

using the hash value as a key to identify the string during subsequent processing of the data records.

39. One or more computer-readable media containing computer-executable instructions for performing operations comprising:

sequentially transforming data records;

upon detecting a particular string in a data record, calculating a hash value from said particular string;

replacing the string in the data record with the calculated hash value;

upon encountering the same string in a subsequent data record, recalculating the hash value from the string and replacing the string in the subsequent data record with the calculated hash value, without looking up the previously calculated hash value;

using the hash value as a key to identify the string during subsequent processing of the data records.

40. A data collection and warehousing facility that receives log entries from a plurality of servers and transforms the log entries to produce transformed data for use in a data warehouse, the transformation comprising:

determining a plurality of strings to be represented by keys;

when encountering one of said strings in a log entry, calculating a hash value from the string;

replacing the string in the log entry with the hash value;

upon encountering the same string in a subsequent log entry, recalculating the hash value from the string and replacing the string in the subsequent log entry with the calculated hash value, without looking up the previously calculated hash value; using the hash value as a key to identify the string during subsequent processing of the data records.

* * * * *

UNITED STATES PATENT AND TRADEMARK OFFICE
CERTIFICATE OF CORRECTION

PATENT NO. : 6,721,749 B1
DATED : April 13, 2004
INVENTOR(S) : Najm et al.

It is certified that error appears in the above-identified patent and that said Letters Patent is hereby corrected as shown below:

Column 2,
Line 30, replace "invovled" with -- involved --.

Column 11,
Line 24, delete "of the" between "the" and "parsing".

Signed and Sealed this

Sixth Day of July, 2004

JON W. DUDAS
*Acting Director of the United States Patent and Trademark Office*